(12) United States Patent
Albarran et al.

(10) Patent No.: US 8,631,635 B2
(45) Date of Patent: Jan. 21, 2014

(54) DECORING MECHANISM WITH MECHANIZED HARVESTER

(71) Applicant: Dole Fresh Vegetables, Inc., Salinas, CA (US)

(72) Inventors: Serafin Albarran, Salinas, CA (US); Daniel Albarran, Greenfield, CA (US); Jorge Alejo, Salinas, CA (US); Ignacio Barajas, Salinas, CA (US); Richard Bascou, Monterey, CA (US); Dennis Castillo, Salinas, CA (US); Maximino Corral, Calexico, CA (US); Whit Frans, Yuma, AZ (US); Frank E. Davis, Monterey, CA (US); Stephen C. Jens, Winchester, MA (US); Raul Machuca, Prunedale, CA (US); Manuel Magana, Salinas, CA (US); Carlos Meza, Salinas, CA (US); Gabriel Villasenor, Somerton, AZ (US); Terry Young, Sunnyvale, TX (US)

(73) Assignee: Dole Fresh Vegetables, Inc., Westlake Village, CA (US)

(*) Notice: Subject to any disclaimer, the term of this patent is extended or adjusted under 35 U.S.C. 154(b) by 0 days.

(21) Appl. No.: 13/663,411

(22) Filed: Oct. 29, 2012

(65) Prior Publication Data
US 2013/0111870 A1 May 9, 2013

Related U.S. Application Data

(63) Continuation of application No. 13/158,276, filed on Jun. 10, 2011, now Pat. No. 8,312,701.

(51) Int. Cl.
*A01D 45/00* (2006.01)

(52) U.S. Cl.
USPC .................................................. 56/327.1

(58) Field of Classification Search
USPC .......... 56/327.1, 98, 13.6; 171/27, 42, 22, 61, 171/38
See application file for complete search history.

(56) References Cited

U.S. PATENT DOCUMENTS

| 1,168,467 | A | 1/1916 | Bell |
| 2,855,058 | A | 10/1958 | Krier et al. |
| 3,339,354 | A | 9/1967 | Kessler |
| 3,388,538 | A | 6/1968 | Markham |
| 3,485,023 | A | 12/1969 | See |
| 3,503,196 | A | 3/1970 | Jarrett |

(Continued)

FOREIGN PATENT DOCUMENTS

| AU | 2009201445 A1 | * | 12/2009 |
| DE | 2707261 A | * | 8/1978 |

(Continued)

*Primary Examiner* — Árpád Fábián-Kovács
(74) *Attorney, Agent, or Firm* — Morrison & Foerster LLP

(57) ABSTRACT

A mechanical harvester for harvesting produce with a core planted in a field is provided. The mechanical harvester includes a chassis, a positioning apparatus, a decoring device, and a transport assembly. The positioning apparatus is connected to the chassis and configured to position the produce in the ground for harvesting and decoring. The decoring device is connected to the positioning apparatus and configured to sever the core of the produce while the produce is in the ground. The transport assembly is connected to the chassis and configured to lift the cut produce from the ground and transport the cut produce to a processing unit or a storage container.

11 Claims, 5 Drawing Sheets

(56) References Cited

U.S. PATENT DOCUMENTS

| | | | |
|---|---|---|---|
| 3,586,108 A | 6/1971 | Wedgeworth et al. | |
| 3,587,216 A * | 6/1971 | Grether | 56/327.1 |
| 3,658,132 A | 4/1972 | Akesson et al. | |
| 3,680,291 A | 8/1972 | Soteropulos | |
| RE27,674 E * | 6/1973 | Grether | 56/327.1 |
| 3,791,117 A | 2/1974 | Lawrence | |
| 3,800,518 A * | 4/1974 | Baggiolini et al. | 56/327.1 |
| 3,808,783 A | 5/1974 | Sutherland et al. | |
| 3,821,987 A * | 7/1974 | Shepardson et al. | 171/61 |
| 3,827,222 A | 8/1974 | Toti | |
| 3,827,503 A * | 8/1974 | Hansen | 171/38 |
| 3,853,016 A | 12/1974 | Lane, III et al. | |
| 3,982,384 A | 9/1976 | Rohweder et al. | |
| 4,009,557 A | 3/1977 | Reicks | |
| 4,036,123 A | 7/1977 | Conkey | |
| 4,090,296 A | 5/1978 | Di Piero | |
| 4,094,238 A * | 6/1978 | Striplin | 99/643 |
| 4,185,696 A * | 1/1980 | Williams et al. | 171/38 |
| 4,211,161 A | 7/1980 | Jourdan et al. | |
| 4,244,161 A | 1/1981 | Guiter | |
| 4,337,612 A | 7/1982 | Dean et al. | |
| 4,353,201 A * | 10/1982 | Pierce et al. | 56/364 |
| 4,453,458 A | 6/1984 | Altman | |
| 4,798,281 A | 1/1989 | Egger | |
| 4,856,715 A | 8/1989 | Fordyce | |
| 5,056,223 A | 10/1991 | Buck et al. | |
| 5,354,569 A | 10/1994 | Brown et al. | |
| 5,560,190 A * | 10/1996 | Ottaway | 56/327.1 |
| 5,934,054 A | 8/1999 | Landeis | |
| 6,036,989 A * | 3/2000 | Ellis | 426/484 |
| 6,298,865 B1 | 10/2001 | Brown et al. | |
| 6,378,281 B1 * | 4/2002 | Ottaway | 56/327.1 |
| 6,467,248 B2 | 10/2002 | Brown | |
| 6,607,769 B1 | 8/2003 | Krymskiy et al. | |
| 6,622,467 B1 * | 9/2003 | Ottaway | 56/327.1 |
| 6,766,948 B1 | 7/2004 | Burns | |
| 6,996,964 B2 * | 2/2006 | Maconachy et al. | 56/327.1 |
| 7,062,899 B2 | 6/2006 | Maconachy et al. | |
| 7,395,653 B2 | 7/2008 | de Groot et al. | |
| 7,703,367 B1 | 4/2010 | Bayless | |
| 7,712,296 B2 * | 5/2010 | Costa et al. | 56/327.1 |
| 7,867,536 B2 | 1/2011 | Kargenian | |
| 8,074,365 B2 * | 12/2011 | Nash et al. | 30/346 |
| 8,136,335 B2 * | 3/2012 | Dobson | 56/327.1 |
| 2002/0104302 A1 | 8/2002 | Brown | |
| 2002/0164407 A1 | 11/2002 | Wolfe et al. | |
| 2003/0182808 A1 | 10/2003 | Mireles, Sr. et al. | |
| 2004/0149545 A1 | 8/2004 | Tarantino et al. | |
| 2004/0161509 A1 | 8/2004 | Maconachy | |
| 2004/0187465 A1 | 9/2004 | Tarantino et al. | |
| 2004/0187466 A1 | 9/2004 | Garcia, Jr. et al. | |
| 2004/0187467 A1 | 9/2004 | Garcia, Jr. et al. | |
| 2004/0265437 A1 | 12/2004 | Rianda | |
| 2005/0066824 A1 | 3/2005 | Brown et al. | |
| 2005/0112256 A1 | 5/2005 | Mitchell et al. | |
| 2005/0233039 A1 | 10/2005 | Wolfe et al. | |
| 2006/0090780 A1 | 5/2006 | Brown et al. | |
| 2007/0031541 A1 | 2/2007 | Kargenian | |
| 2007/0095041 A1 | 5/2007 | de Groot et al. | |
| 2007/0221072 A1 | 9/2007 | de Groot et al. | |
| 2009/0249630 A1 | 10/2009 | Deiman et al. | |
| 2010/0257984 A1 | 10/2010 | Scaroni et al. | |
| 2010/0291276 A1 | 11/2010 | Groot et al. | |
| 2012/0102907 A1 * | 5/2012 | Jens et al. | 56/327.1 |

FOREIGN PATENT DOCUMENTS

| | | | | |
|---|---|---|---|---|
| GB | 1591434 A * | 6/1982 | | A01D 45/26 |
| JP | 2000236729 A * | 9/2000 | | |
| WO | 94/26134 A1 | 11/1994 | | |
| WO | 97/02758 A1 | 1/1997 | | |
| WO | 98/06273 A1 | 2/1998 | | |
| WO | WO 49849 A1 * | 8/2000 | | |
| WO | 02/101888 A2 | 12/2002 | | |
| WO | 03/015541 A1 | 2/2003 | | |
| WO | 2005/082033 A2 | 9/2005 | | |
| WO | 2005/082033 A3 | 12/2006 | | |
| WO | 2007/066190 A2 | 6/2007 | | |
| WO | 2007/069898 A1 | 6/2007 | | |
| WO | 2010/018543 A1 | 2/2010 | | |

* cited by examiner

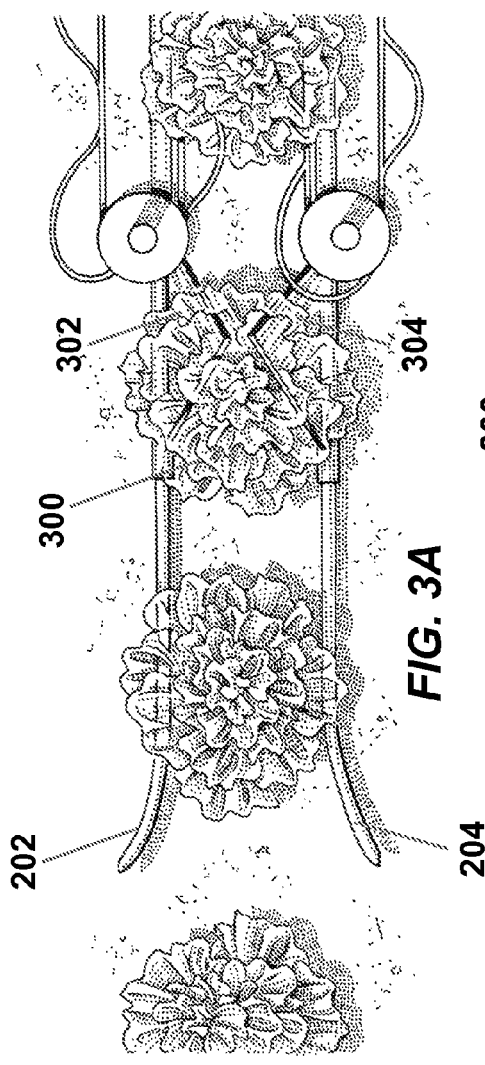
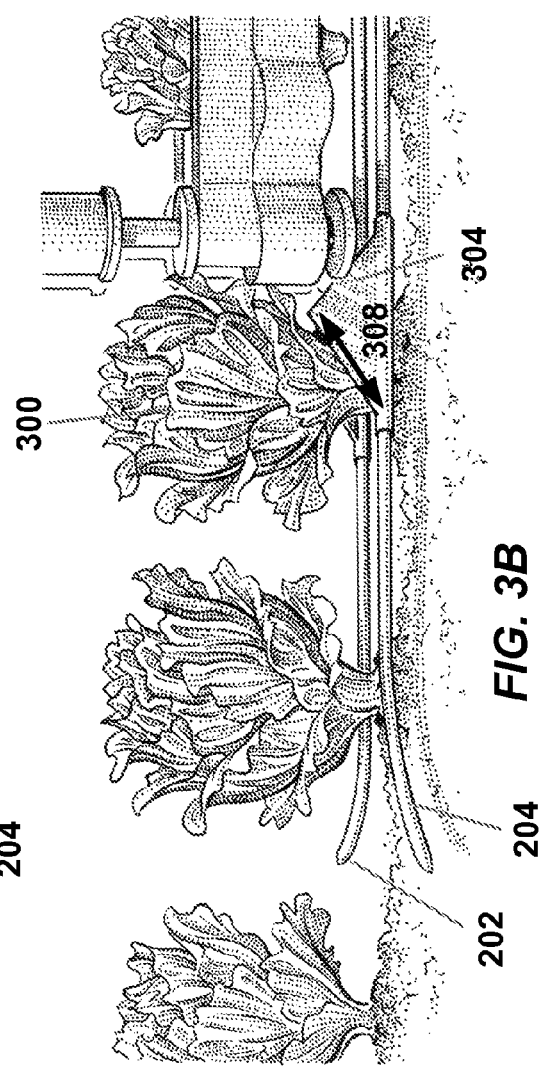
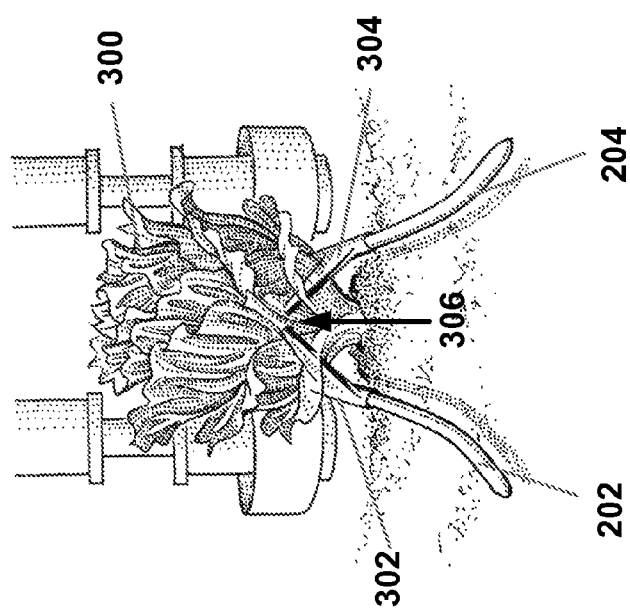
*FIG. 3A*
*FIG. 3B*
*FIG. 3C*

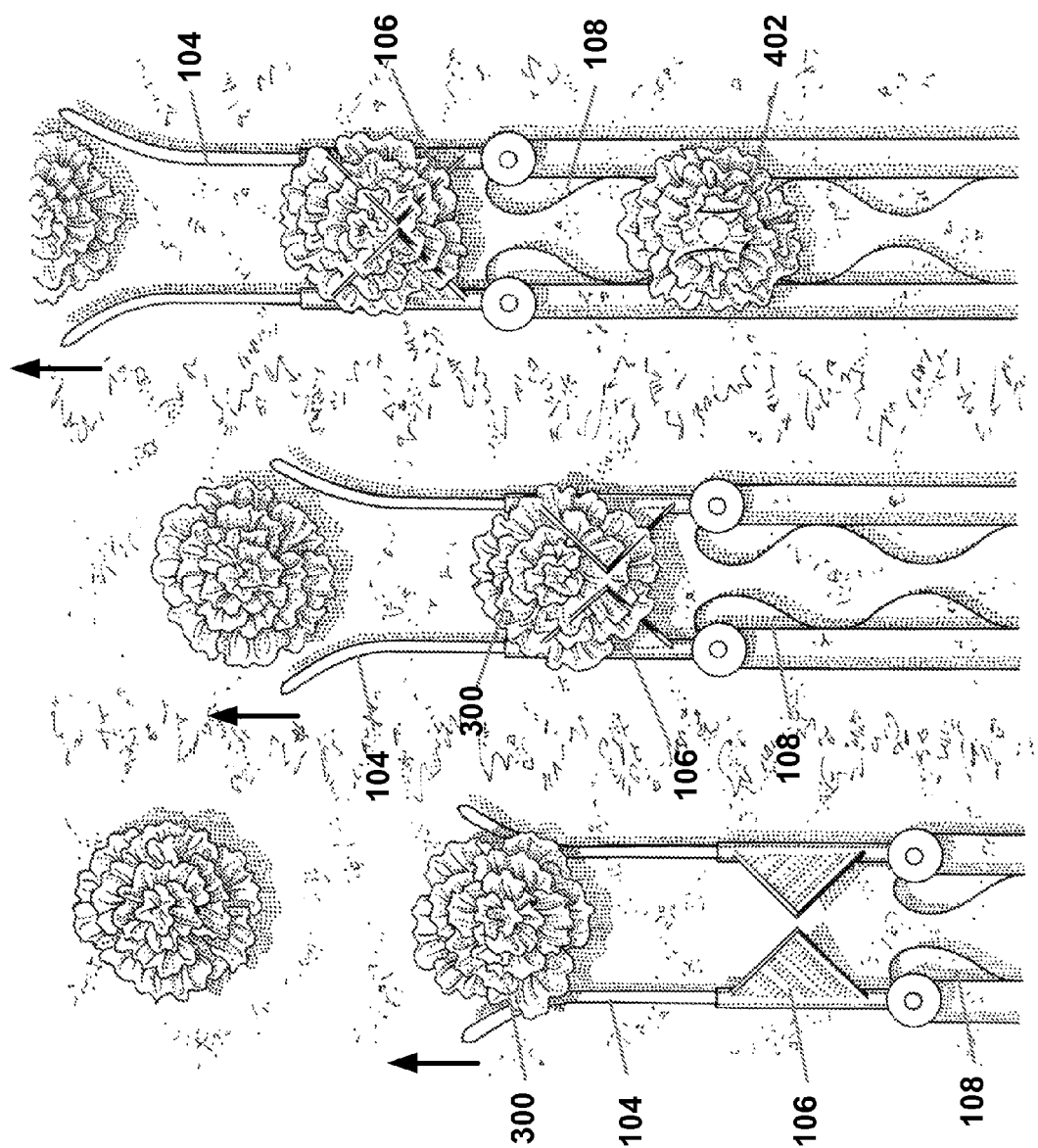

DECORING MECHANISM WITH MECHANIZED HARVESTER

CROSS REFERENCE TO RELATED APPLICATIONS

This application is a Continuation of U.S. patent application Ser. No. 13/158,276, filed Jun. 10, 2011 (now issued as U.S. Pat. No. 8,312,701), which is hereby incorporated by reference in its entirety.

BACKGROUND

1. Field

The present disclosure generally relates to mechanically harvesting and decoring agricultural products, and, more particularly, to a mechanical harvester for harvesting and mechanically removing the core from produce planted in a field, the produce having a core, such as iceberg lettuce, romaine lettuce, and cabbage.

2. Description of Related Art

Romaine lettuce, iceberg lettuce, and cabbage are commercially planted as seeds or seedlings in rows in a field. Because these types of produce tend to be somewhat irregular and delicate, commercial harvesting of these produce is generally a manual process.

Conventionally, the harvesting process involves several steps. First, a field worker harvests the produce using a harvesting knife, by cutting the stem of the produce planted in the ground. Next, the field worker removes the core and any remnant amount of stem. The field worker then places the harvested produce on a moving platform for subsequent processing and packing. This decoring step is performed by field workers, who are preparing the harvested produce for commercial packaging (e.g., for prepackaged salad mixes).

This labor-intensive decoring step often requires a worker with an experienced eye to remove the core so as to maximize the desirable portions and minimize the waste portions of the harvested produce. A poorly cut produce will result in too much waste material remaining attached to the produce, or too many desirable portions ending up in waste.

BRIEF SUMMARY

In one exemplary embodiment, a mechanical harvester for harvesting and decoring a produce planted in a field is provided. The mechanical harvester includes a chassis, to which is attached a positioning apparatus, a decoring device, and a transport assembly. The positioning apparatus is configured to position the produce in the ground for harvesting and decoring, and includes a first positioning arm and a second positioning arm. Each of the two positioning arms has a straight section and a bent section. The bent sections of the positioning arms are bent away from each other to receive the produce in the ground as the mechanical harvester moves forward. The straight sections of the positioning arms are configured to hold the produce in place for decoring. The decoring device is configured to sever the core of the produce, which remains attached to the roots in the ground. The transport assembly is configured to lift the cut produce off of the severed core and transport the cut produce to a processing unit or a storage container.

DESCRIPTION OF THE FIGURES

The present application can be best understood by reference to the following description taken in conjunction with the accompanying figures, in which like parts may be referred to by like numerals:

FIGS. 3A (top view), 3B (side view), and 3C (front view) depict a positioning apparatus and a decoring device of the exemplary mechanical harvester;

FIGS. 4A, 4B, and 4C illustrate an exemplary method of harvesting and decoring produce with a mechanical harvester.

DETAILED DESCRIPTION

To provide a more thorough understanding of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Figure 1:
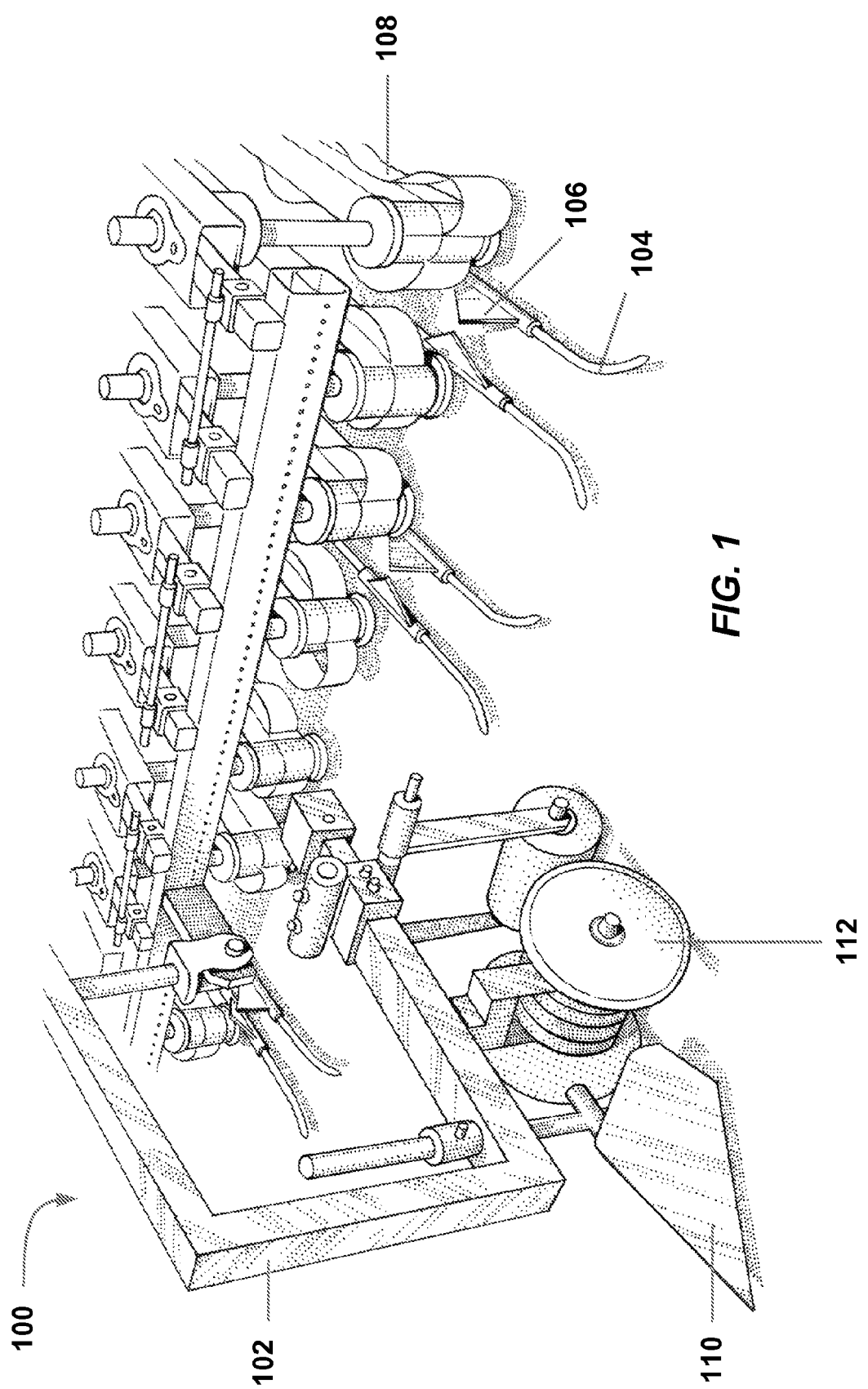
FIG. 1 depicts an exemplary embodiment of a mechanical harvester.

With reference to FIG. 1, an exemplary mechanical harvester 100 is depicted. As described below, mechanical harvester 100 is configured to harvest and decore produce having a core, such as romaine lettuce, iceberg lettuce, cabbage, or the like. To harvest and decore produce in the field, mechanical harvester 100 moves through the field while severing the produce from its core to release the produce, lifting the released produce from the ground, and transporting the released produce. The released produced that is decored may be transported to a storage bin or a container for future processing, or to a processing platform connected to mechanical harvester 100 for more immediate processing. Processing may include, for example, inspecting, sorting, trimming, washing, and packaging.

As depicted in FIG. 1, mechanical harvester 100 includes chassis 102. A positioning apparatus 104 is connected to chassis 102 to position the produce in the ground for harvesting and decoring by decoring device 106.

Figure 2:
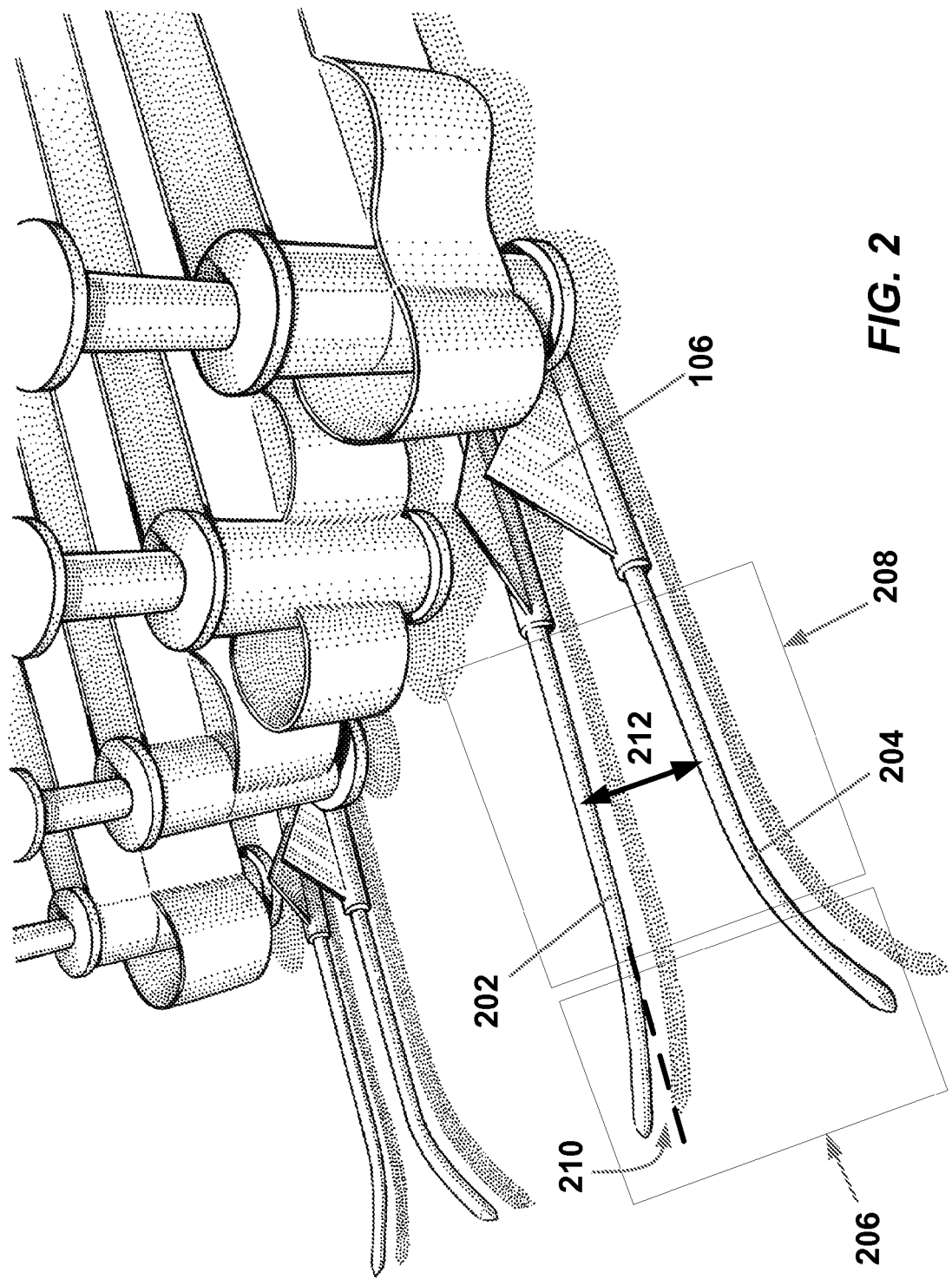
FIG. 2 depicts a positioning apparatus of the exemplary mechanical harvester.

As depicted in FIG. 2, in the present exemplary embodiment, positioning apparatus 104 includes positioning arms 202 and 204. Each of positioning arms 202 and 204 has bent section 206 and straight section 208. Bent sections 206 of positioning arms 202 and 204 receive the produce within the row. As mechanical harvester 100 moves forward, the straight sections 208 of positioning arms 202 and 204 hold the produce in place, and decoring device 106 cuts through the produce to sever the core.

As depicted in FIG. 2, bent sections 206 of positioning arms 202 and 204 are bent away from each other. Each of positioning arms 202 and 204 form an interior angle (depicted by element 210) of 15 degrees. It should be recognized, however, that the size of interior angle 210 may vary. Interior angle 210 may be anywhere from 0 degrees to 60 degrees. It should be recognized that bent sections 206 of positioning arms 202 and 204 are configured to receive the produce in a way that minimizes bruising or damage to the produce, which may be planted or have grown slightly to the left or right within a row. In the exemplary embodiment, as depicted in FIG. 2, the bent sections of the positioning arms may be curved. In other exemplary embodiments, the bent sections of the positioning arms may be straight or have an irregular shape.

Once the produce is received by the bent sections of the positioning arms, straight section 208 holds the produce in place for decoring. As depicted in FIG. 2, positioning arms 202 and 204 in straight section 208 have a parallel configuration with a width (depicted by element 212) of 4 inches. It should be understood, however, that width 212 may vary depending on the type of produce harvested. Width 212 may be anywhere between 1 inch to 10 inches apart. In some embodiments, width 212 may be 1, 2, 3, 4, 5, 6, 7, 8, 9, or 10 inches apart. Width 212 is selected to firmly hold the produce in place for decoring, while avoiding bruising or damage to the produce. Moreover, in other embodiments, the width near the end that receives the produce may differ from the width near the end connected to the chassis.

It should be recognized, however, that the positioning apparatus may have any configuration that can receive and hold the produce for harvesting and decoring. Once the produce is held firmly in place by positioning apparatus 104, the produce is ready for decoring as mechanical harvester 100 moves forward in the field. Decoring device 106 may be integrated with positioning apparatus 104. In particular, decoring device 106 may be integrated with positioning arms 202 and 204.

As depicted in FIGS. 3A, 3B, and 3C, in the exemplary embodiment, the decoring device has blades 302 and 304 connected to positioning arms 202 and 204, respectively. Blades 302 and 304 have a straight cutting edge with a length (depicted by element 308 in FIG. 3B) of 3 inches. Blades 302 and 304 have a V-shaped configuration, in which the blades form an interior angle (depicted by element 306 in FIG. 3C) of 30 degrees. As mechanical harvester 100 moves forward in the field, the decoring device fixed to the mechanical harvester moves forward and cuts through the produce held in place by the positioning apparatus. As depicted in FIGS. 3A and 3C, blades 302 and 304 cut the core on two sides. The cuts sever the core from the produce, and the severed core remains attached to the roots of the produce in the ground.

It should be understood, however, that length 308 (FIG. 3B) and interior angle 306 (FIG. 3C) of decoring device 106 may vary depending on the type of produce and the size of the core to be removed for that particular type of produce. Length 308 may be anywhere from 0.5 inches to 5 inches. In some embodiments, length 308 may be 0.5, 1, 1.5, 2, 2.5, 3, 3.5, 4, 4.5, or 5 inches. Interior angle 306 may be anywhere from 0 degrees to 120 degrees. In some embodiments, interior angle 306 may be 0, 5, 10, 15, 20, 25, 30, 35, 40, 45, 50, 55, 60, 65, 70, 75, 80, 85, 90, 95, 100, 105, 110, 115 and 120 degrees.

While FIGS. 3A, 3B, and 3C depict the decoring device with two straight blades connected to positioning apparatus 104, the decoring device may include any cutting device connected to mechanical harvester 100, and configured to slice the core on two sides. In another exemplary embodiment, decoring device 106 includes one V-shaped blade connected to chassis 102. Other examples of suitable cutting devices may include one or more flat blades, curved blades, knives (e.g., ultrasonic, vibrating knife), bandsaws, rotating blades or water jet-cutting devices.

Although two positioning apparatus and decoring devices have been depicted in FIGS. 1 and 2, it should be recognized that any number of positioning apparatus and decoring devices may be used to harvest and decore produce from multiple rows of produce at a time. Multiple positioning apparatuses 104 and decoring devices 106 may be included in mechanical harvester 100 to cut produce from multiple rows of produce at one time. In other words, mechanical harvester 100 can harvest from at least as many rows of produce as the number of positioning apparatus 104 and decoring devices 106 that are included in mechanical harvester 100.

After severing the core from the rest of the produce, a transport assembly connected to the mechanical harvester lifts the cut produce off of the severed core. It should be understood that any transport assembly capable of moving the cut produce to a bin, container, or platform for further processing may be employed. As depicted in FIG. 1, in the exemplary embodiment, transport assembly 108 is made up of movable belts configured to hold, lift, and transport the produce after the produce is cut from its core. The movable belts may deposit the produce onto a moving platform or an elevator belt to be transported to a platform for further processing. Processing steps may include, for example, inspecting, sorting, trimming, washing, and packaging. Alternatively, the moveable belts may deposit the produce into a storage bin or a container.

Furthermore, as depicted in FIG. 1, mechanical harvester 100 includes plow 110 positioned in front of decoring device 106. In a position forward to the decoring device, the plow may reach the produce before the decoring device when mechanical harvester 100 is moving. In other exemplary embodiments, a plow may be optionally connected to the mechanical harvester. The plow may keep vegetation and other debris from collecting on the decoring device. Additionally, mechanical harvester 100 may include more than one plow in a position forward to wheel 112 of mechanical harvester 100. The plow may also keep vegetation and other debris from collecting on wheel 112 of mechanical harvester 100.

Figure 5:
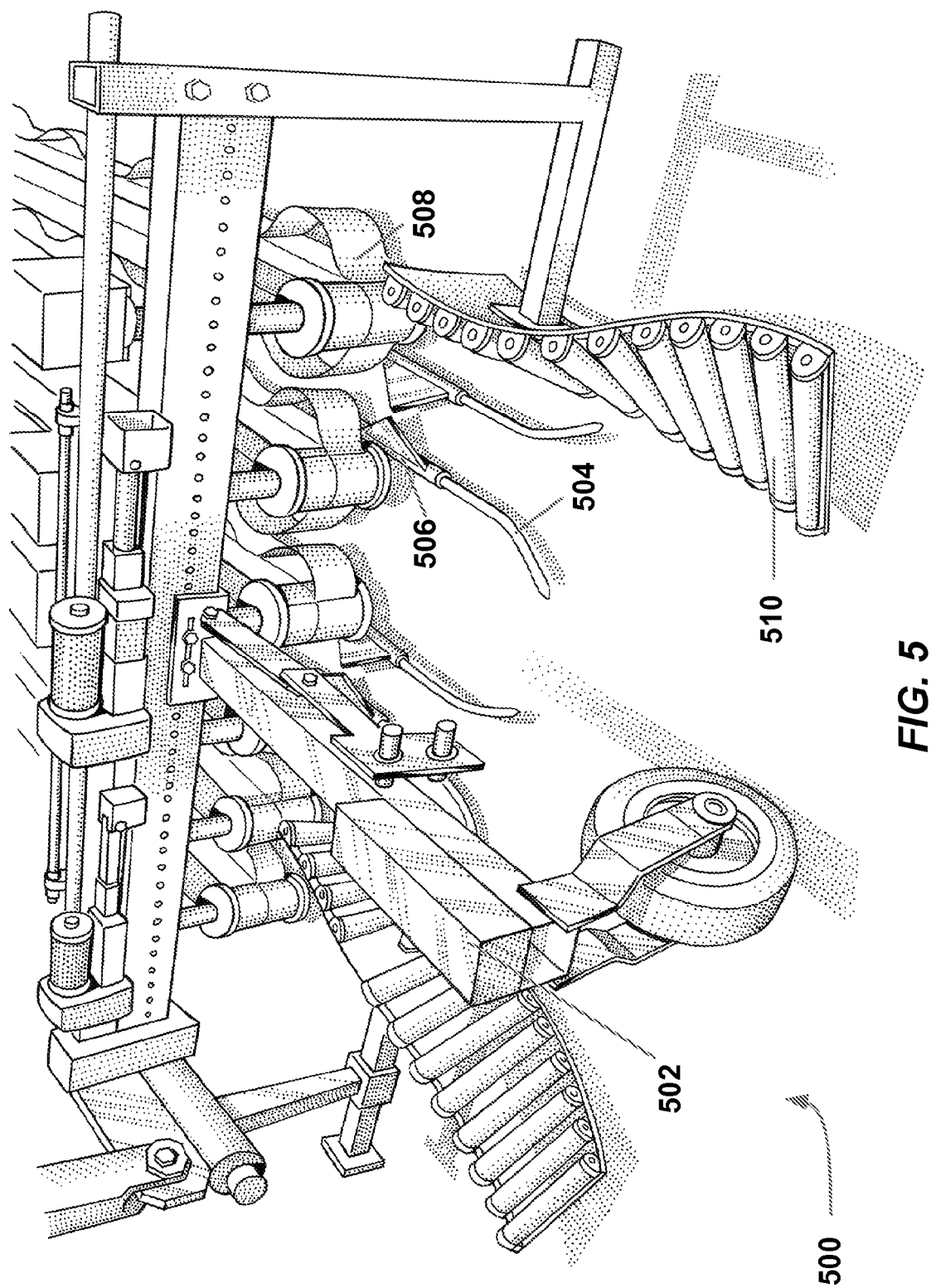
FIG. 5 depicts another exemplary embodiment of a mechanical harvester with roller guides.

The mechanical harvester may include additional devices to align and position the produce in the ground for harvesting by decoring device 106. As depicted in FIG. 5, in another exemplary embodiment, mechanical harvester 500 includes chassis 502. A positioning apparatus 504 is connected to chassis 502 to position the produce in the ground for harvesting and decoring by decoring device 506. Additionally, mechanical harvester 500 has roller guide 510, which is connected to chassis 502. Roller guide 510 includes a series of rollers that help position produce lying at an angle in the ground for decoring. By adjusting the angle of the produce in the ground, the produce may be better aligned for harvesting and decoring by decoring device 506. While FIG. 5 depicts roller guide 510, it should be understood that any devices or methods known in the art that can be used to guide produce lying at an angle into the decoring device may be employed.

The harvesting and decoring process performed in the field is illustrated in FIGS. 4A, 4B, and 4C. With reference to FIG. 4A, the direction of travel of mechanical harvester 100 (FIG. 1) brings the positioning apparatus 104 (FIG. 1) to produce 300 (FIG. 3). With reference to FIG. 4B, as mechanical harvester 100 (FIG. 1) moves forward, positioning apparatus 104 (FIG. 1) positions and holds produce 300 (FIG. 3) in place as coring device 106 (FIG. 1) exerts sufficient force to cut through produce 300 (FIG. 3). The belts of the transport system engage with the produce while the coring knives penetrate the produce. This helps facilitate the cutting and coring of the produce, otherwise, if the produce has a weak root system, the coring knives may push the produce rather than cut through it. With reference to FIG. 4C, as mechanical harvester 100 (FIG. 1) continues to travel through the field, transport assembly 108 (FIG. 1) lifts and moves cut produce 402 towards the rear of mechanical harvester 100 (FIG. 1).

The foregoing descriptions of specific embodiments have been presented for purposes of illustration and description. They are not intended to be exhaustive, and it should be understood that many modifications and variations are possible in light of the above teaching.

What is claimed is:

1. A mechanical harvester for harvesting and decoring a produce planted in a field, the produce having a core, a stem, and roots extending from the stem when the produce is growing in the ground, the mechanical harvester comprising:
- a chassis;
- a positioning apparatus configured to position the produce in the ground for harvesting and decoring, wherein the positioning apparatus comprises:
  - a first positioning arm; and
  - a second positioning arm,
    - wherein each of the first and second positioning arms has a straight section and a bent section, and wherein the bent sections of the first and second positioning arms are bent away from each other;
- a decoring device configured to sever a substantial portion of the core of the produce while the produce is in the ground, wherein the decoring device comprises:
  - a first blade connected to the first positioning arm; and
  - a second blade connected to the second positioning arm,
    - wherein the first blade and the second blade are angled towards each other to sever a substantial portion of the core of the produce while the produce is in the ground, and
    - wherein a portion of the first positioning arm and a portion of the second positioning arm are in contact with the produce in the ground when the first blade and the second blade come in contact with the produce in the ground; and
- a transport assembly comprising one or more moveable belts, configured to lift the cut produce from the ground, and transport the cut produce to a processing unit or a storage container,
- wherein the positioning apparatus, the decoring device, and the transport assembly are connected to the chassis.

2. The mechanical harvester of claim 1, wherein the first and second positioning arms in the bent section are bent away from each other, and wherein each positioning arm is bent to form an interior angle of greater than 0 degrees to 60 degrees.

3. The mechanical harvester of claim 1, wherein the straight sections of the first and second positioning arms have a parallel configuration with a width of 1 inch to 10 inches apart.

4. The mechanical harvester of claim 3, wherein the first and second blades each have a length of 0.5 inches to 5 inches.

5. The mechanical harvester of claim 1, further comprising:
- one or more roller guides, wherein the one or more roller guides are connected to the chassis, and wherein the one or more roller guides position the produce in the ground for harvesting and decoring.

6. The mechanical harvester of claim 1, wherein the transport assembly is further configured to pull the produce through the decoring device.

7. The mechanical harvester of claim 1, wherein the transport assembly comprises:
- a movable first belt, wherein the movable first belt includes a first set of produce grippers; and
- a movable second belt, wherein the movable second belt includes a second set of produce grippers,
- wherein a portion of the first set of produce grippers opposes a portion of the second set of produce grippers, when the cut produce is held between the first set and second set of produce grippers, and
- wherein the opposing produce grippers are configured to compress and exert a force on the cut produce to hold the cut produce between the movable first and second belts.

8. A mechanical harvester for harvesting and decoring a produce planted in a field, the produce having a core, a stem, and roots extending from the stem when the produce is growing in the ground, the mechanical harvester comprising:
- a chassis;
- a positioning apparatus configured to position the produce in the ground for harvesting and decoring, wherein the positioning apparatus comprises:
  - a first positioning arm; and
  - a second positioning arm,
    - wherein each of the first and second positioning arms has a straight section and a bent section, and wherein the bent sections of the first and second positioning arms are bent away from each other; and
- a decoring device configured to sever a substantial portion of the core of the produce while the produce is in the ground, wherein the decoring device comprises:
  - a first blade connected to the first positioning arm; and
  - a second blade connected to the second positioning arm,
    - wherein the first blade and the second blade are angled towards each other to sever a substantial portion of the core of the produce while the produce is in the ground, and
    - wherein a portion of the first positioning arm and a portion of the second positioning arm are in contact with the produce in the ground when the first blade and the second blade come in contact with the produce in the ground,
- wherein the positioning apparatus and the decoring device are connected to the chassis.

9. The mechanical harvester of claim 8, wherein the first and second positioning arms in the bent section are bent away from each other, and wherein each positioning arm is bent to form an interior angle of greater than 0 degrees to 60 degrees.

10. The mechanical harvester of claim 8, wherein the straight sections of the first and second positioning arms a parallel configuration with a width of 1 inch to 10 inches apart.

11. The mechanical harvester of claim 8, wherein the first and second blades each have a length of 0.5 inches to 5 inches.

* * * * *